United States Patent Office 3,525,530
Patented Aug. 25, 1970

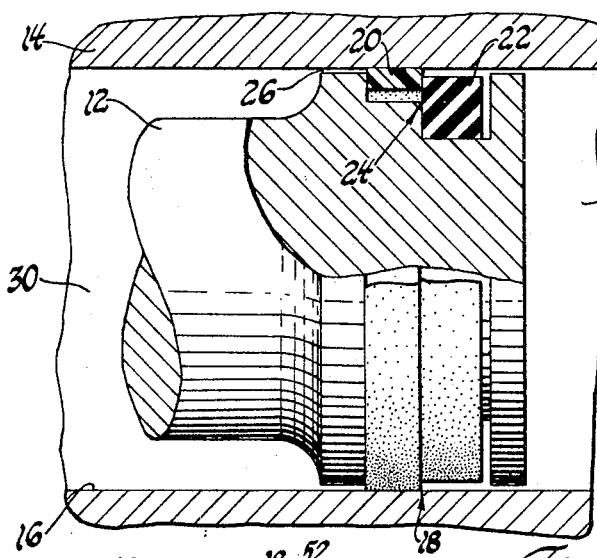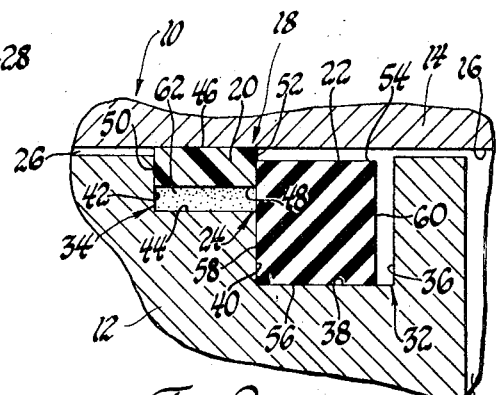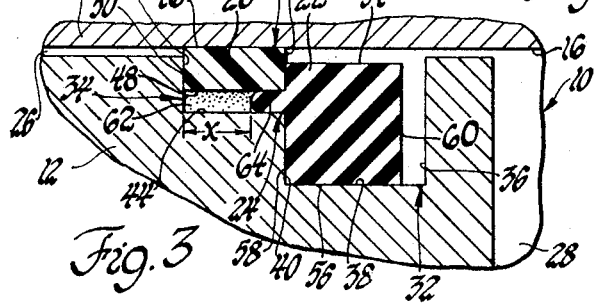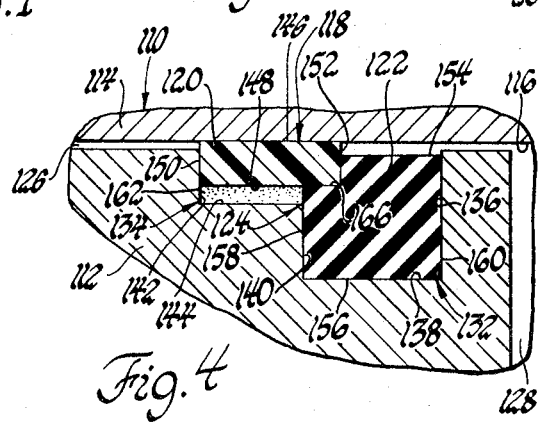

3,525,530
HIGH PRESSURE-LOW FRICTION SEAL
Charles J. Bauer, Dayton, and George E. Kellogg, Miamisburg, Ohio, assignors to General Motors Corporation, Detroit, Mich., a corporation of Delaware
Filed June 10, 1968, Ser. No. 735,678
Int. Cl. F16j 9/06, 15/00
U.S. Cl. 277—165   5 Claims

ABSTRACT OF THE DISCLOSURE

A fluid sealing arrangement for sealing between a relatively reciprocating piston and cylinder wherein a primary sealing element retained within a groove formed in the piston has a radially outwardly facing surface sealingly engaging the cylinder bore and a radially inwardly facing surface radially spaced from the base of the groove so as to form a cavity. A secondary sealing element also retained within the groove sealingly engages the primary sealing element and, upon fluid pressurization, a portion thereof extrudes axially into and seals the cavity to thereby prevent fluid forces from acting beneath the primary sealing element and increasing the latter's sliding friction.

---

Leakage of fluid between relatively reciprocating members is often the result of a failure in the sealing elements due to abrasive frictional wear. One factor contributing to this wear is the finish of the surface to be sealed, however, this problem can be easily minimized by well-known production techniques. The other factor is the sliding or kinetic friction which is dependent upon the kinetic coefficient of friction and the frictional force between the sealing element and the surface to be sealed. When it is recognized that the sliding friction between the sealing element and the surface to be sealed should be as low as possible to avoid interference with the desired movement of the members, it has previously been considered necessary to use large frictional forces in high pressure applications to achieve the required positive sealing between the members.

Prior constructions have attempted to solve the problem of frictional wear by using a sealing element formed from a low friction material. However, under high fluid pressures, the sealing element is axially compressed and the resulting radial expansion increases the frictional forces on the sealing element. The greater sliding friction caused thereby increases the frictional wear on the sealing element and shortens its useful life. In cases where there is a radial spacing between the sealing element and the groove in which it is retained, the pressure of the fluid applies a direct radially outwardly force on the sealing element and the sliding friction between the latter and the cylinder is proportionately increased.

Other sealing installations in the prior art have used a low friction primary sealing element in combination with a deformable secondary sealing element. In these arrangements, as the pressure builds up in the fluid chamber, the secondary sealing element compressively deforms and bears outwardly against an inclined surface of the primary sealing element to bias the latter into positive sealing engagement with the cylinder bore. However, as in the previously described low friction sealing arrangements, the frictional engagement of the primary sealing element with the cylinder bore increases in proportion to pressure of the sealed fluid. In high pressure applications, this frictional engagement greatly increases the wear on the sealing element and necessitates frequent and costly replacement of the sealing elements.

The frictional force required for sealing at a given pressure is known to be relatively independent of the coefficient of friction of the materials and can be easily achieved in assembly by proper design of: (1) the interference fit between the sealing element and the surface to be sealed, and (2) the circumferential area of sealing engagement. Therefore, it would be desirable to utilize a low friction sealing element having a frictional engagement with the surface to be sealed only to the extent that is necessary to seal the highest operating fluid pressure.

The fluid sealing arrangement of the present invention accomplishes the above objective by using an essentially non-deformable primary sealing element to sealingly engage the surface to be sealed and a deformable secondary sealing element cooperating therewith in a manner that eliminates outwardly directed force components on the primary sealing member due to fluid pressure. More specifically, this objective is achieved by retaining the primary sealing element within a groove formed in a piston. The primary sealing member has a radially outwardly facing surface in sealing engagement with a cylinder bore and a radially inwardly facing surface radially spaced from the base of the groove. The seconadary sealing element is formed of a deformable material such as rubber and has a radially inwardly facing surface frictionally and sealingly retained within the groove and a radially outwardly facing surface radially spaced from the cylinder surface. The primary sealing element is axially sealed by a side wall of the groove and an axial surface of the secondary sealing element. The secondary sealing element is compressed under pressure and an annular portion thereof axially extrudes between the base of the groove and the inwardly facing surface of the primary sealing member. The extruded portion establishes a sealed axially extending cavity, the pressure in which is essentially independent of the fluid pressure. As a result, the radially outwardly directed force components of the type that would be encountered if there was a pressure buildup beneath the primary sealing element are eliminated and a pressure balance exists between outwardly and inwardly facing surfaces. Inasmuch as the frictional forces are maintained essentially constant, the sliding friction between the sealing members and the cylinder bore is unaffected by and relatively independent of the pressure of the sealed fluid. The result of this combination is a sealing arrangement, uniquely adapted to high pressure applications, having a frictional wear rate previously found only in low pressure installations.

Accordingly, the objects of the present invention are: to provide a low friction fluid sealing arrangement for high fluid pressure reciprocating installations; to minimize the sliding friction between relatively reciprocating members in high flud pressure applications by providing a dual element sealing arrangement wherein a primary sealing element sealingly engages a surface of the member to be sealed and a secondary sealing element sealingly engages the sealing member and cooperates with the primary sealing element in a manner that limits the frictional forces acting on the sealing arrangement due to fluid pressure; to provide a fluid seal for sealing between relatively reciprocating members wherein a first sealing element formed of low friction material sealingly engages the surface to be sealed and a deformable second sealing element cooperatively engages the former to limit the frictional forces of the first sealing element with the surface to be sealed as the fluid seal is subjected to pressurized fluid; and to provide a fluid seal for sealing between a relatively reciprocating piston and cylinder bore in applications where the fluid seal is exposed to periods of cyclic pressurization wherein a low friction primary sealing element retained within a groove formed in the piston has a first surface radially spaced from the groove and the second surface sealingly engaging the cylinder bore, and, a secondary sealing element also retained within the groove extrudes axially into the space between the primary sealing element and the groove to establish an essentially constant pressure cavity therebetween whereby the frictional force between the primary sealing element and the cylinder bore is relatively independent of fluid pressure.

These and other objects will be apparent to one skilled in the art upon reading the following detailed description, reference being made to the accompanying drawings in which:

FIG. 1 is a fragmentary cross-sectional view of a piston and cylinder incorporating the fluid sealing arrangement made in accordance with the present invention;

FIG. 2 is an enlarged fragmentary cross-sectional view showing the sealing elements of FIG. 1 in an unpressurized condition;

FIG. 3 is a view similar FIG. 2 showing the sealing elements in a pressurized condition;

FIG. 4 is a view similar to FIG. 2 showing another embodiment of the present invention in an unpressurized condition;

FIG. 5 is a view showing the embodiment of FIG. 4 in a pressurized condition;

FIG. 6 is a view similar to FIG. 2 showing still another embodiment in an unpressurized condition; and FIG. 7 is a view showing the embodiment of FIG. 6 in a pressurized condition.

Referring to FIG. 1, there is shown a fluid sealing arrangement 10 comprising a reciprocable piston 12, a cylinder 14 having a bore 16 defining a surface to be sealed, and a dual element fluid seal 18 including a primary or first sealing element 20 and a secondary or second sealing element 22. The fluid seal 18 is retained within an outwardly opening circumferential groove, generally indicated by the reference numeral 24, formed in the outer periphery of the piston 12. The primary sealing element 20 and the secondary sealing element 22 cooperate in a manner to be hereafter explained to seal the annular space 26 between the adjacent surfaces of the piston 12 and the cylinder 14 and thereby prevent the migration of fluid from a fluid chamber 28 to a gas chamber 30. It will be appreciated that the fluid within the fluid chamber 28 will undergo a cyclic pressurization between a minimum and maximum value as the piston 12 reciprocates within cylinder 14 while the pressure in the gas chamber 30 will remain relatively constant or noncyclic.

Referring to FIG. 2, the groove 24 is generally stepped in configuration and comprises an annular U-shaped portion 32 and a contiguous outwardly stepped L-shaped portion 34. The U-shaped portion 32 is defined by a radially extending end wall 36, an axially extending base 38 and a radially extending intermediate wall 40. The L-shaped portion 34 is defined by a radially extending end wall 42 and an axially extending base 44. While a groove having a stepped configuration is structurally and functionally preferred, it will hereafter become apparent to those skilled in the art that other shapes are equally adaptable for use with the present invention.

The primary sealing element 20 is generally rectangular in cross section and is defined by axially extending radially spaced surfaces 46 and 48 and radially extending axially spaced surfaces 50 and 52. The primary sealing element 20 is preferably formed from a synthetic resin material such as polytetrafluoroethylene. In addition to having a low coefficient of friction, the material selected for the primary sealing element 20 should be essentially non-deformable throughout the range of operating pressures in the fluid chamber 28.

The secondary sealing element 22 is essentially square in cross section and is defined by axially extending radially spaced surfaces 54 and 56 and radially extending axially spaced surfaces 58 and 60. An elastomeric compound such as rubber, which compressively deforms under pressure, is a preferred material for the secondary sealing element 22.

In assembly, the radially outwardly facing surface 46 sealingly engages the radially inwardly facing surface of the cylinder bore 16. The radially inwardly facing surface 48 is radially spaced from the base 44 of the L-shaped portion 34 and defines therebetween an axially extending cavity 62. The surface 52 is radially aligned with the intermediate wall 40 and the surface 50 is in sealing engagement with side wall 42 so that the primary sealing element 20 is axially co-extensive with base 44.

The secondary sealing element 22 is located within the annular U-shaped portion 32 and, to prevent axial shifting during reciprocation of the piston 12, the surface 56 has an interference fit with respect to the base 38 to effect a fixed sealing engagement therebetween. The surface 58 is in sealing engagement with the intermediate wall 40 and the surface 52 of the primary sealing element 20. In the unpressurized state, as shown in FIG. 2, the surface 60 is axially spaced from the side wall 36 and the surface 54 is radially spaced from the cylinder bore 16.

The surface 46 of the primary sealing element 20 has an interference fit with respect to the surface of the cylinder bore 16 and, in combination with the circumferential sealing area between the aforementioned surfaces, is designed to affirmatively seal the annular space 26 between the fluid chamber 28 and the gas chamber 30 under the maximum operating pressure. As will be explained in greater detail below, the frictional force established by the interference fit between surface 46 and the cylinder bore 16 will be relatively constant and in combination with the coefficient of friction of the materials establishes the sliding friction at a stable value substantially independent of fluid pressure.

Referring to FIGS. 2 and 3, as the pressure in the fluid chamber 28 is increased, the surfaces 54 and 60 are similarly pressurized, thereby axially and radially inwardly compressing the secondary sealing element 22. As a result, an annular portion 64 of the secondary sealing element 22 axially extrudes into the cavity 62 thereby sealing the latter from the fluid chamber 28 and maintaining the pressure therewithin at an essentially constant level. Thus, a pressure balance exists between the surfaces 46 and 48 for an axial distance generally indicated by the reference letter $x$. Consequently, a pressurization of the fluid in the fluid chamber 28 will not cause an increase in the frictional force between the surface 46 and the cylinder bore 16, and, the sliding friction between the primary sealing element 20 and the cylinder bore 16 will be maintained at approximately the unpressurized value.

The exact area of pressure balance will be dependent upon the amount of axial extrusion of the annular portion 64 which, in turn, is dependent on pressure encountered and the material selected for the second sealing element 22. By proper design, this figure can be regulated to establish a desired maximum sliding friction. Any effects of the radially outwardly directed forces on the primary sealing element 20 caused by the extruded portion 64 are somewhat obviated by the compressive loading of the former between the end wall 42 and the surface 58. This compressive loading between the aforementioned surfaces increases the static friction therebetween. Consequently, any radially outward extrusion of the primary sealing element 20 will be reduced until this opposing force is overcome.

Another embodiment of the present invention is shown in FIGS. 4 and 5 in which the elements and parts thereof corresponding to the previously described elements will be denoted by adding 100 to their identifying numerals. As shown in FIG. 4, the secondary sealing element 122 is formed with an annular notch 166 in surfaces 154 and 158 that sealingly receives therewithin a radially inwardly facing surface 148 and an axially facing surface 152 of the primary sealing element 120. As in the previously described embodiment, a radially inwardly facing surface 156 of the secondary sealing element 122 sealingly and fixedly engages the base 138 of the groove 124 and an axially facing surface 158 sealingly engages the intermediate wall 140. Additionally, the axially facing surface 160 sealingly engages the end wall 136 thereby leaving only a portion of the radially outwardly facing surface 154 exposed to fluid pressure.

Referring to FIG. 5, as pressure is applied to the fluid in the fluid chamber 128, the surface 154 is pressurized and the secondary element 122 is radially inwardly compressed thereby causing an annular portion 164 to axially extrude into the cavity 162. Consequently, a pressure balance exists between the surfaces 148 and 146 for an axial distance indicated by the reference letter $x'$. The frictional force between the primary sealing element 120 and the cylinder bore 116 will be substantially that of the unpressurized state over the distance so designated. Inasmuch as the radially outwardly forces transmitted from the secondary sealing element 122 to the primary sealing element 120 extends over a larger area, the sliding friction will be slightly greater than in the embodiment previously described.

A third embodiment of the present invention is shown in FIGS. 6 and 7, in which elements and parts thereof corresponding to the embodiment of FIGS. 1 through 3 are denoted by adding 200 to the reference numerals. Referring to FIG. 6, an annular outwardly opening groove 224 is formed in the piston 212. The groove 224 is generally U-shaped in cross section and is defined by radially extending side walls 242 and 236 and an axially extending base 238. A dual element fluid seal comprising a primary sealing element 220 and a secondary sealing element 222 is located within the groove 224. The primary sealing element 220 has a radially outwardly facing surface 246 sealingly engaging the cylinder bore 216 and a radially inwardly facing surface 248 radially spaced from the base 238 to define a cavity 262 extending axially therebetween. One axially facing surface 250 sealing engages the side wall 242 and the other axially facing surface 252 is formed with a conical chamfer 268 at its radially inwardly facing edge.

The secondary sealing element 222 is generally circular in cross section and includes an axially facing annular portion 270 that sealingly engages the surface 252 and a radially inwardly facing surface 272 that sealingly and frictionally engages the abse 238. The secondary sealing element 222 is axially and radially spaced from the side wall 236 and the cylinder bore 216. As shown in FIG. 7, pressurization of the fluid in the fluid chamber 228 radially inwardly and axially compresses the secondary sealing element 222 such that an annular portion 264 thereof is axially extruded along the chamfer 268 and the base 238 into the cavity 262 to seal the latter from fluid in the manner previously described. In this embodiment, the pressure balance beween surfaces 246 and 248 will exist for an axial distance designated by the reference letter $x''$ and the frictional force between the sealing element 220 and the cylinder bore 216 will be substantially that of the unpressurized state over the axial distance so designated.

While for purposes of disclosure, the above embodiments have incorporated the fluid sealing arrangement within a groove formed in a reciprocable piston to seal the inner surface of the cylinder, those skilled in the art will appreciate that the present invention is equally adaptable within a groove formed in the cylinder and sealing an associated reciprocating shaft, and, thus, would more closely resemble a packing gland or similar seal installation.

While only three forms of this invention have been shown and described, other forms will be readily apparent to those skilled in the art. Therefore, it is not intended to limit the scope of this invention by the embodiments selected for the purpose of this disclosure but only by the claims which follow.

What is claimed is:

1. A fluid sealing arrangement for preventing leakage of fluid under pressure between concentric relatively reciprocating members, comprising: an annular groove formed in one of the members, said groove defined by axially spaced radially extending surfaces and an axially extending base radially spaced from the other of said members; an essentially non-deformable annular primary sealing element located within said groove, said primary sealing element having a first surface sealingly engaging the other of said members and a second surface radially spaced from the base of the groove so as to form a cavity; an elastomeric secondary sealing element retained in the groove adjaecnt said primary sealing element and having a first surface fixedly and sealingly engaging said base of said groove and a second surface radially spaced from said other of said reciprocating members, said secondary sealing element normally sealingly engaging a radial surface of the primary sealing element to urge the latter into sealing engagement with one of said radially extending surfaces of said groove and adapted when subjected to said fluid under pressure to have a portion thereof compressively deform into a portion of said cavity to seal the latter so as to prevent the fluid under pressure from acting upon the primary sealing element to increase the sliding friction between the members.

2. A fluid sealing arrangement for preventing leakage of fluid past adjacent surfaces of concentric relatively reciprocating members, comprising: an annular circumferential groove formed in one of said members defined by axially spaced radially extending surfaces and an axially extending base radially spaced from the other of said members to form an axially extending circumferential cavity; a first sealing element located within the groove having a radially inwardly facing surface radially spaced from said base of said groove and a radially outwardly facing surface sealingly engaging said other of said members and sized so as to establish a predetermined sliding friction therebetween; an elastomeric second sealing element located within said groove having a radially inwardly facing surface sealingly engaging said base of said groove and one axially facing surface sealingly engaging the first sealing element and urging the latter into sealing engagement with one of said radially extending surfaces of said groove, said second sealing element having a radially outwardly facing surface radially spaced from said other of said reciprocating members and the other axially facing surface axially spaced from the other of said radially extending surfaces of said groove whereby said last mentioned surfaces are exposed to fluid under pressure whereupon said second sealing element is compressed and an annular portion thereof axially extrudes into a portion of said cavity between said base of said groove and said radially inwardly facing surface of said first sealing element thereby establishing a sealed axially extending circumferential cavity from which fluid pressure forces are excluded so that said sliding friction between the first sealing element and the other of said members is relatively independent of the pressure of said fluid.

3. A fluid sealing arrangement for preventing leakage of fluid under pressure between concentric relatively reciprocating members, comprising: a radially outwardly opening annular groove formed in one of said members defined by axially spaced radially extending surfaces and an axially extending base radially spaced from the other of said members; an annular first sealing element of essentially non-deformable material located within the groove having a radially outwardly facing surface sealingly engaging said other of said members and a radially inwardly facing surface radially spaced from said base of said groove to form an axially extending circumferential cavity; an annular elastomeric second sealing element located within said groove having a radially inwardly facing surface sealingly engaging said base of said groove and one axially facing surface sealingly engaging the first sealing element and urging the latter into sealing engagement with one of said radially extending surfaces of said groove, said second sealing element having the other axially facing surface engaging the other of said radially extending surfaces of said groove and radially outwardly facing surface radially spaced from said other of said reciprocating members whereby only said last mentioned surface is exposed to fluid under pressure whereupon said second sealing element is radially compressed and an annular portion thereof axially extrudes into a portion of said cavity between said base of said groove and said radially inwardly facing surface of said first sealing element thereby establishing a sealed axially extending circumferential cavity from which fluid pressure forces are excluded so that the sealing engagement between the first sealing element is relatively independent of fluid pressure.

4. A fluid sealing arrangement for preventing migration of fluid under pressure past the annular space between concentric relatively reciprocating members comprising: a radially outwardly opening annular groove formed in one of said members, said groove having axially spaced radially extending surfaces and an axially extending base radially spaced from the other of said members; an annular first sealing element of an essentially non-deformable material located within said groove and having a radially outwardly facing surface sealingly engaging said other of said members and one axially facing surface sealingly engaging one of said radially extending surfaces of said groove to form an axially extending circumferential cavity, said first sealing element having a radially inwardly facing surface radially spaced from said base of said groove and the other axially facing surface axially spaced from the other of said radially extending surfaces of said groove; a conical chamfer formed in the first sealing element contiguously with said radially inwardly facing surface and said other axially facing surface; an annular elastomeric second sealing element having a generally circular axial cross section retained in the groove in the space between said other axially facing surface of said first sealing element and said other of said radially extending surfaces of said groove; said second sealing element fixedly engaging said base of said groove and sealingly engaging said other axially facing surface of said first sealing element whereby said fluid under pressure axially and radially inwardly compresses said second sealing element causing an annular portion thereof to axially extrude along said chamfer and into a portion of said cavity between said base of said groove and said radially inwardly facing surface of said first sealing element to establish a sealed axially extending cavity in which the pressure is substantially constant so that the sealing engagement between the first sealing element and the other of said reciprocating members is relatively independent of the pressure of said fluid.

5. A fluid sealing arrangement for preventing leakage of fluid under pressure between a cylinder and a reciprocating piston, comprising: an essentially non-deformable annular primary sealing element located within a radially outwardly opening annular groove formed in the piston, said groove defined by opposed axially facing surfaces commonly joined by a radially outwardly facing base radially spaced from cylinder, said primary sealing element having a radially inwardly facing surface radially spaced from the base of the groove to form an axially extending circumferential cavity, said primary sealing element having a radially outwardly facing surface being sized to sealingly engage and maintain a predetermined sliding friction with said cylinder; an elastomeric secondary sealing element retained in the groove adjacent the primary sealing element having a radially inwardly facing surface fixedly and sealingly engaging said base and a radially outwardly facing surface radially spaced from said cylinder, said secondary sealing element axially engaging and sealing engaging the primary sealing element so as to urge the latter into sealing engagement with one of said axially facing surfaces of said groove whereby fluid under pressure compressively deforms said secondary sealing element causing an annular portion thereof to axially extrude into a portion of said cavity between said base of said groove and said radially inwardly facing surface of said primary sealing thereby establishing a sealed axially extending cavity therebetween in which the pressure is substantially constant so that said sliding friction between the primary sealing element and said cylinder is relatively independent of the pressure of said fluid.

References Cited
UNITED STATES PATENTS

| | | | |
|---|---|---|---|
| 2,705,177 | 3/1955 | Waring | 277—177 X |
| 2,739,855 | 3/1956 | Bruning | 277—188 |
| 2,877,070 | 3/1959 | Lee | 277—165 |
| 3,362,720 | 1/1968 | Henry et al. | 277—176 |

SAMUEL ROTHBERG, Primary Examiner

U.S. Cl. X.R.

277—176, 177, 188